Jan. 30, 1968     R. J. POWELL ET AL     3,365,878
TURBOCHARGER WASTE GATE CONTROLLER
Original Filed Jan. 15, 1965     3 Sheets-Sheet 1
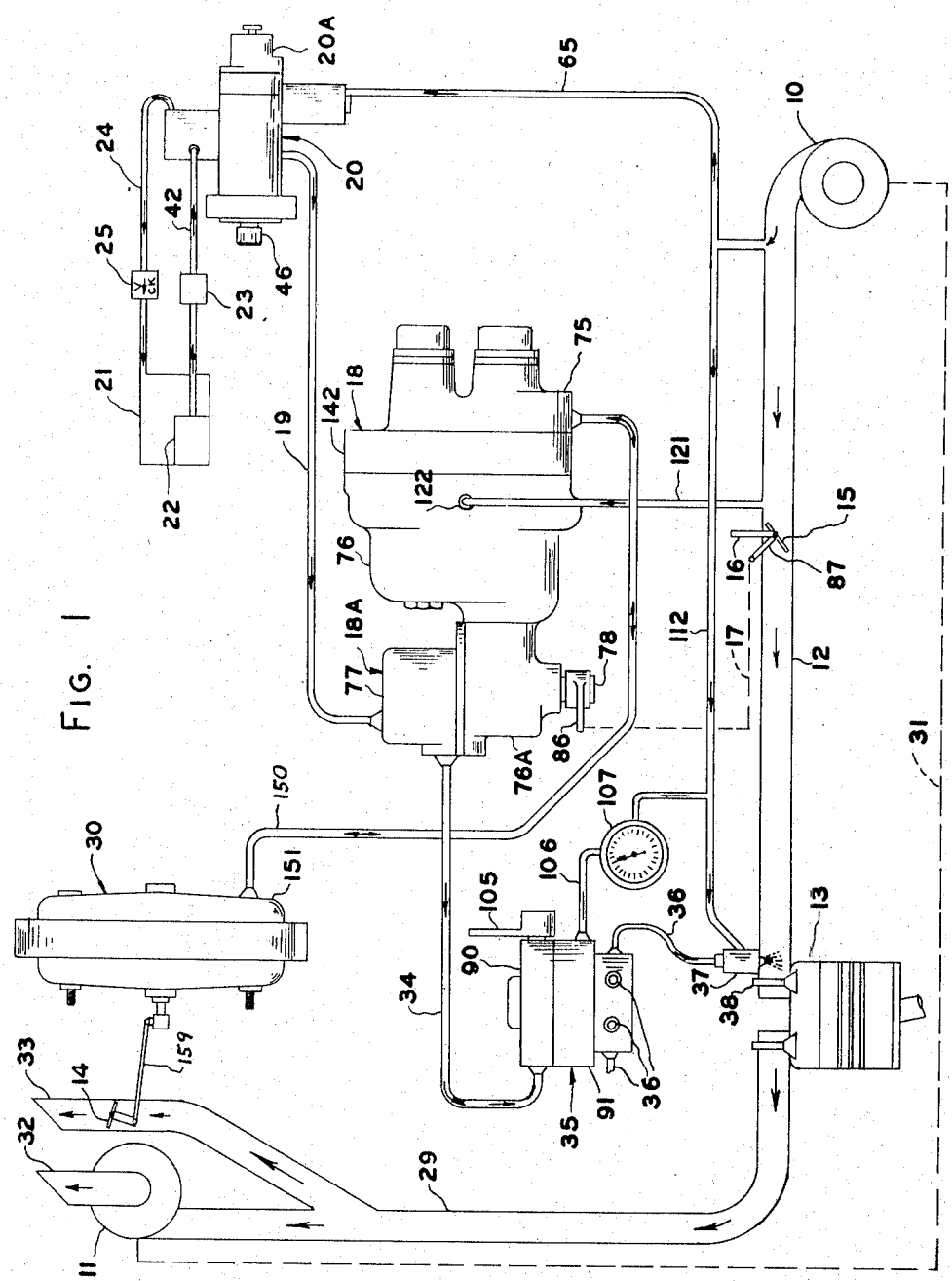
INVENTORS.
ROBERT J. POWELL
JAMES E. CHAMPION
ATTORNEYS

INVENTORS.
ROBERT J. POWELL
JAMES E. CHAMPION

ATTORNEYS

INVENTORS.
ROBERT J. POWELL
JAMES E. CHAMPION

ATTORNEYS

United States Patent Office 3,365,878
Patented Jan. 30, 1968

3,365,878
TURBOCHARGER WASTE GATE CONTROLLER
Robert J. Powell and James E. Champion, Muskegon, Mich., assignors to Continental Motors Corporation, Muskegon, Mich., a corporation of Virginia
Original application Jan. 15, 1965, Ser. No. 427,210. Divided and this application Apr. 11, 1966, Ser. No. 541,650
7 Claims. (Cl. 60—13)

ABSTRACT OF THE DISCLOSURE

A system for metering the fuel delivered to a turbocharged engine including an engine driven fuel pump, a controller for regulating the pressure of the fuel and for bypassing fuel and which functions in accordance with supercharger pressure upstream of the throttle, a control for varying fuel delivery from the controller relative to throttle position, a manual control for selectively varying fuel delivery from the throttle control to provide for economy cruise and idle cut-off and a device for controlling turbocharger speed which is responsive to discharge pressure of the turbocharger and selected settings of the throttle with an atmospheric pressure controlled override at and above critical altitude.

---

This application is a division of our co-pending application Ser. No. 427,210, filed Jan. 15, 1965, now abandoned which in turn was a continuation of now abandoned but co-pending application, Ser. No. 320,389, filed Oct. 31, 1963.

The present invention relates to fuel systems for internal combustion engines and more particularly to a continuous flow fuel-air charging system preferably adapted for utilization in turbocharged multi-cylinder engines for aircraft and integrating the operation of the turbocharger control with an improved manifold pressure controller and an automatic compensating fuel controller to produce optimum functioning of engines under all conditions.

Under standard ambient conditions from sea level to critical altitude, the horsepower output from a multicylinder turbocharged aircraft engine remains almost constant with a constant manifold pressure. Manifold pressure, since it depends at least in part upon supercharger airflow, can be regulated to maintain the desired constant pressure at any selected position of the throttle by providing a controller which regulates the speed of the turbine at all throttle positions in response to variations in supercharger discharge pressure upstream of the throttle and the throttle position. Ideally, for all altitudes up to critical, at any selected throttle setting, absolute manifold pressure will be automatically maintained at a constant in the present invention, so that the pilot will not be required to continually adjust the throttle. At and above critical altitude, an automatic control is provided to modify or override the manifold pressure controller, retaining a selected maximum ratio of manifold pressure to altitude pressure to prevent turbocharger overspeeding and overheating. Further, turbocharger discharge pressure is used for air aspirating fuel injection nozzles and to automatically adjust fuel pressure to compensate the fuel flow to the cylinders during acceleration when the turbocharger boost produced by the manifold pressure controller has not caught up with the positioning of the air throttle, and at critical altitude and above where the air throttle is positioned to be fully opened to maintain the desired ratio of manifold pressure to atmospheric pressure.

An important function of the present fuel pump control is to adjust fuel pump outlet pressure and hence fuel flow at altitude when the turbocharger is not working. On all naturally aspirated engines without an automatic mixture control on the fuel metering system, it is necessary to manually lean at altitude. On a turbocharged engine, as long as the turbocharger is working, leaning is not required except for economy cruise. However, when the power is reduced to a low level, as for rapid descent, supercharger outlet pressure drops to approximately ambient pressure, and leaning is required if the engine is to continue to function. The present fuel pump control accomplishes this leaning automatically. The device is also important in improving acceleration and throttle response in progressing from natural aspiration of the engine to supercharging.

Thus, an object of the present invention is to improve engine performance by producing a pneumatically controlled fuel-air charging system designed for optimum engine operation.

Another object of the invention is to improve engine fuel-air control reliability by providing a control system readily operated with little effort.

A further object of the invention is to improve engine operation by providing a fuel-air charging system controllable with maximum safety to the engine and supercharger.

Yet another object of the invention is to prevent overloading, overspeeding and overheating of an engine and its turbocharger by providing an improved fuel-air charging control system.

Still another object of the invention is to improve engine operation under all conditions by providing an improved and simplified control system functioning fast enough to prevent manifold pressure or speed surging during operation.

Yet a further object of the invention is to improve automatic turbocharged engine fuel pump controls by providing a bypass metering means automatically varying fuel pump outlet pressure and hence fuel flow to satisfy engine requirements at all times.

It is another object of the present invention to increase economies in turbocharged internal combustion engines by providing a control system for automatically regulating supercharger air flow to maintain a desired constant manifold pressure for each position of the air throttle for all altitudes up to critical.

It is still another object of the present invention to simplify the controls of internal combustion engines having a turbocharger by providing an automatically operating supercharger airflow regulating system.

Still further objects and advantages of the present invention will readily occur to one skilled in the art to which the invention pertains upon reference to the following drawings illustrating a preferred embodiment of the invention and in which like reference characters refer to like parts throughout the several views and in which FIG. 1 is a diagrammatic representation of a preferred system incorporating the present invention.

Figure 3:
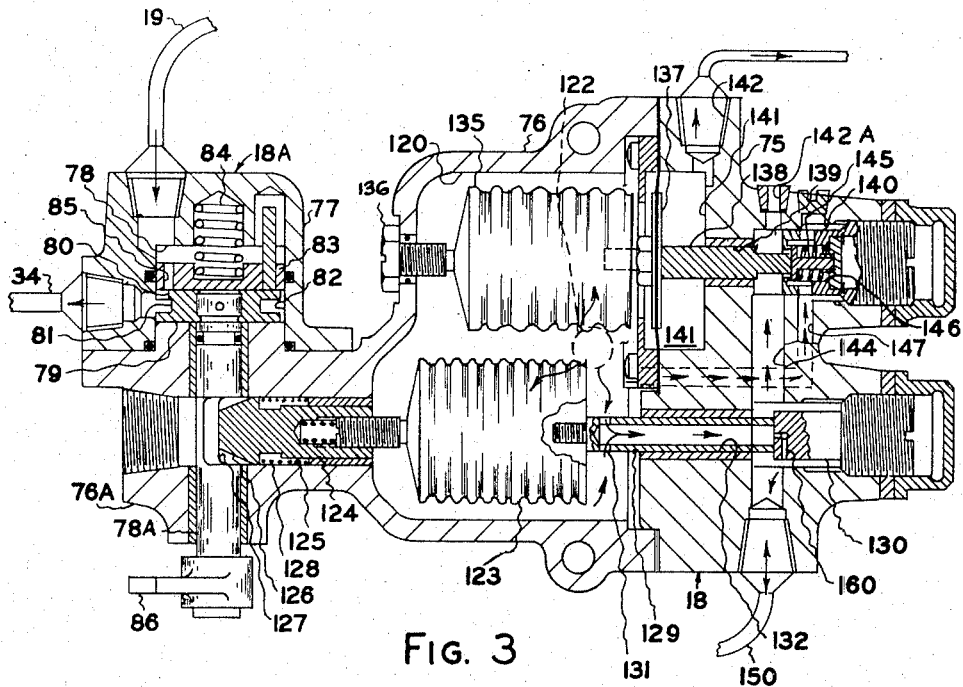
FIG. 3 is a cross sectional diagrammatic view of a preferred manifold pressure controller of the present invention.

Referring to the drawings for a more detailed understanding of the invention, FIG. 1 illustrates diagrammatically the major components of the present fuel-air charging control system of the present invention, the system comprising a supercharger 10 driven by an exhaust turbine 11, the combination normally referred to as a turbocharger. The supercharger delivers compressed air through a duct 12 to the intake of the cylinders 13 (only one shown) of an internal combustion engine. Exhaust gases selectively drive the turbine 11 depending on the position of a waste-gate valve 14 in an exhaust bypass duct.

An air throttle valve 15 is manually operable through a throttle lever 16 and is connected through throttle linkage 17 (dash line) to a manifold pressure and fuel metering controller assembly 18.

Fuel is delivered to the controller assembly 18 through a conduit 19 by a fuel pump assembly 20, taking fuel from the fuel tank 21, which contains an electrical auxiliary fuel pump 22, the fuel passing through a filter 23. Vapor is removed from the fuel and returned to the tank 21 through a conduit 24 containing a check valve 25.

The controller assembly 18 operates a waste gate actuator 30 as will be hereafter explained, the actuator correspondingly operating to vary the position of the waste gate valve 14. When the valve 14 is closed, exhaust gases in a duct 29, which are under pressure, are directed to the turbine 11 which is drivingly connected with the supercharger 10 as indicated by the dash line 31. Expended exhaust gases are then discharged through an exhaust pipe 32.

When the valve 14 is open, exhaust gas pressure is bypassed through a duct 33, and the turbine power is correspondingly reduced. Varying positions of the valve 14 produce correspondingly varying bypass of exhaust gases around the turbine 11 so that degrees of turbocharger operation from no power to full power are obtainable.

The controller assembly 18 includes a fuel metering control sub-assembly 18A which variably directs fuel through a conduit 34 to a combination fuel manifold and mixture control valve 35, which in turn delivers fuel through conduits 36 to vented fuel injection nozzles 37 mounted to inject fuel into the air intake manifold adjacent the cylinder air intake valves 38 (only one shown).

Figure 2:
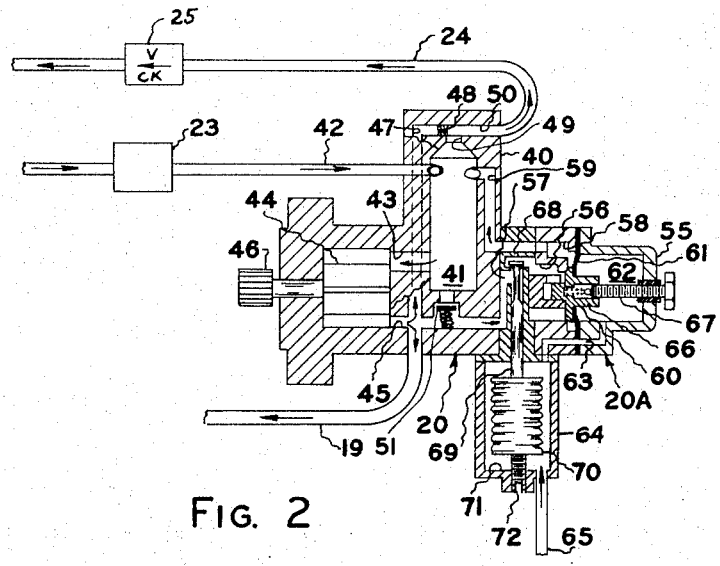
FIG. 2 is a cross-sectional diagrammatic view of a preferred fuel pump assembly, by-pass metering device and vapor separator of the present invention.

The present system operates to maintain optimum fuel-air ratios and manifold pressures by providing desired fuel delivery pressures and flow, and by variably operating the supercharger. Function of the system components, is as follows:

*Fuel pump, relief valve and fuel pressure controller assembly 20, FIG. 2*

This preferred assembly 20 comprises a housing 40 having an intake chamber 41 into which fuel from an inlet conduit 42 is angularly directed to produce a centrifugal swirl, in which vapors will be centralized. Fuel is normally drawn out of the chamber 41 through a passage 43, pressurized by means such as a gear pump 44, and delivered via discharge passage 45 to the conduit 19. The pump 44 is adapted by any means such as a splined shaft 46 to be driven by the engine (not shown).

A passage 47 provided in the housing 40 directs some pressurized fuel through a fuel jet orifice 48, which fuel crosses an opening 49, positioned at the top center of the chamber 41, into a passage 50 connected to the vapor return conduit 24. The effect of the fuel jet 48 is to produce suction for positive removal of vapor from the chamber 41. This vapor separator is substantially like that shown in our prior U.S. Patent No. 2,901,031.

A bypass check valve 51 is provided between the chamber 41 and the passage 45 and operates to open for bypassing fuel from the auxiliary pump 22 (FIG. 1) to the system during engine starting or for emergency operation in the event of failure of pump 44.

A relief valve assembly 20A operates as a downstream pressure control to vary delivery rate of the pump. It is mounted on the housing 40 and comprises a two-part housing 55 having an inlet chamber 56 connected by a passage 57 with the pump discharge passage 45, and an outlet chamber 58 connected by a passage 59 with the pump intake chamber 41.

Intermediate the chambers 56 and 58 is a valve member 60 carried by a diaphragm 61 forming one wall of the outlet chamber 58. The other side of the diaphragm is exposed to a chamber 62 openingly connected by a passage 63 with the interior of an aneroid housing 64 which in turn is openly connected with a conduit 65 leading from the supercharger discharge pressure end of the duct 12 (FIG. 1) upstream of the throttle valve 15.

The valve 60 is biased toward a closed position by a spring 66 whose compression may be manually adjusted by any means such as a screw 67. In normal operation, the valve 60 will be open to a degree at all times, automatically adjusting as downstream fuel pressures tend to vary.

A variable orifice valve 68 operates to vary the delivery capacity of the pump. It is disposed intermediate the passage 57 and chamber 56 and is carried on a shaft 69 connected to an aneroid or bellows 70 disposed in a pressure chamber 71 of the housing 64 and mounted thereon by means of a manually adjustable screw 72 for calibration adjustment.

The variable orifice valve 68, as controlled by the aneroid 70, acts as an automatic fuel pump control. Its most important function is to adjust fuel pump discharge pressure, and hence fuel flow, at altitudes where the turbocharger is not working. On naturally aspirated engines having no automatic mixture control in the fuel metering system, it is necessary to manually lean at altitude. On a turbocharged engine such as the present, as long as the turbocharger is working, leaning is not required except for economy cruise. However, when the power is reduced to a low level, as in rapid descent, supercharger outlet pressure drops to approximate ambient air pressure, and leaning is required if the engine is to continue to function. In the present device, this is accomplished as follows:

When supercharger discharge pressure drops, the pressure in chamber 62, (which is openly connected through passage 63, chamber 71 and passages 65 to air duct 12), decreases to permit the valve 60 to open wider, and simultaneously the aneroid 70 expands, opening the orifice valve 68, thereby reducing fuel pump discharge pressure by relieving more pressure through the relief valve, thus automatically leaning the fuel-air mixture of the engine.

The relief valve 60 regulates fuel pressure at all times, permits adjustment of idle r.p.m. fuel pressure and compensates for lack of fuel pump efficiency at low r.p.m., by tending to impose a substantially constant maximum fuel delivery pressure on the system at any selected manifold pressure. Further, this type of vented diaphragm valve permits operation of the auxiliary fuel pump at pressures up to the setting of the relief valve without upsetting system calibration. The diaphragm 61 must be vented to air throttle inlet pressure; i.e. supercharger discharge pressure, or leaning out would occur at altitude. In the case of naturally aspirated engines, the diaphragm is vented to atmospheric pressure, as described in our U.S. Patent No. 2,991,055.

As described in said patent, the fuel injection system fuel pump for a naturally aspirated engine has a fixed orifice in series with the relief valve. In the present turbocharged engine, the fixed orifice is replaced by the previously described variable orifice valve 68 controlled by the aneroid 70 sensing air throttle inlet pressure, i.e. supercharger discharge pressure. When this pressure rises, the aneroid 70 collapses, decreasing orifice area, and pump outlet pressure increases. Conversely, when air throttle inlet pressure drops as at altitude at low power, the aneroid expands, increasing orifice area, and pump outlet pressure decreases. Thus the orifice is made to serve a multiple function.

*Fuel metering control sub-assembly 18A of controller assembly 18, FIG. 3*

The preferred controller assembly comprises a three-part housing, the parts designated by reference characters 75, 76 and 77.

Fuel under regulated pressure is delivered from the fuel pump assembly 20 via conduit 19 to an inlet chamber 78 in the housing 77. A fuel control shaft 78A is rotatably carried by and extends through the left hand portion 76A of the housing 76 and has secured to the inner end a spool element 79 provided with a slot 80 in one side open to an annular groove 81. The spool element 79 is disposed in an outlet chamber 82 in the housing 77, the outlet chamber being openly connected with the fuel delivery conduit 34.

A partition element 83 separates the inlet chamber 78 from the outlet chamber 82 and is biased by a spring 84 into sealing engagement on the spool element 79. The partition element 83 has a port 85 which is in variable registry with the slot 80 in the spool element 79.

The outer end of the shaft 78A is provided with a lever 86 which, as seen in FIG. 1, is slaved to the air throttle valve 15 from a lever 87 connected thereto.

As the throttle control lever 16 is manually moved to open and close the air throttle valve 15, the shaft 78A is rotated to correspondingly open and close the area of registry between the slot 80 in spool 79 and the port 85 in element 83, thus metering fuel flow to the conduit 34.

Figure 4:
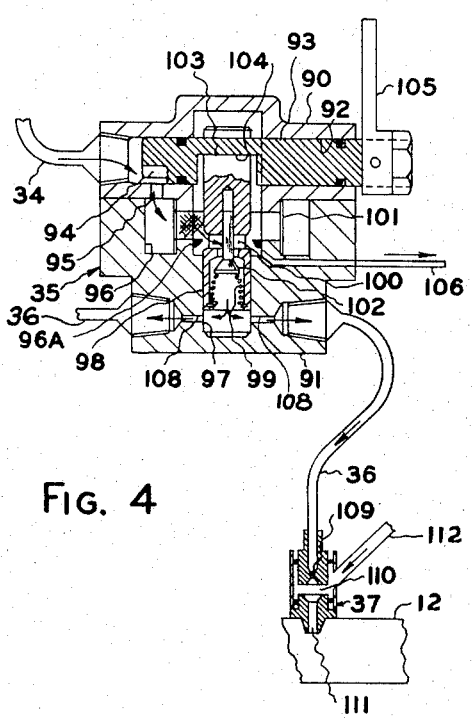
FIG. 4 is a cross sectional view of a preferred fuel distributing manifold and mixture control valve assembly of the present invention.

*Fuel distributing manifold-mixture control valve assembly 35, FIG. 4*

The assembly 35 comprises a two-part housing 90–91. The housing 90 has a bore 92 openly connected at one end to the fuel conduit 34 and containing a rotatable shaft 93. The inner end of the shaft 93 has a groove 94 which variably registers with a port 95 openly connecting the bore 92 with a chamber 96 provided in the housing 91.

The housing 91 has a stepped distributing chamber bore 97 in which is carried a sliding plunger 98 having an inner recess 99 connected by ports 100 with the chamber 96, a fuel strainer screen 101 being disposed in the chamber 96 as shown. A spring biased check valve 102 is disposed between the recess 99 and the ports 100.

The upper end of the plunger 98 has a groove 103 engaged with a slot 104 provided in the shaft 93. The outer end of the shaft 93 has secured thereto a manually operable lever 105. This is the mixture control and idle cut-off lever. The chamber 96 below an annular seal 96A is connected by a conduit 106 to a metered fuel pressure gage 107 (FIG. 1) installed, for example, on the aircraft control panel. A plurality of distributing ports 108 connect the chamber 97 with the conduits 36 delivering fuel to the vented fuel injection nozzles 37.

Each of the nozzles 37 has a fixed fuel jet restriction 109 injecting fuel across an air space 110 into a fuel discharge passage 111 opening into the air intake manifold 12 adjacent the cylinder intake. The air space 110 is connected with supercharger discharge pressure by means of a conduit 112, so that the nozzles are always sensing air throttle inlet pressure to act as a downstream pressure control uniformly with operation of the relief valve 20A. Air aspiration assists fuel atomization in the nozzles 37 before the fuel enters the manifold 12, and prevents siphoning of fuel from the fuel lines 36 on idle cut-off when manifold suction increases.

In the standard fuel injection system on naturally aspirated engines, vented nozzles such as are described in our prior Patents Nos. 2,913,233 and 2,983,491, sense ambient pressure as do the fuel pressure gage, fuel pump and air throttle. On a supercharged engine, there is a new pressure at the air throttle inlet which is above ambient, and hence all those components which are involved in fuel metering must now sense supercharger discharge pressure rather than ambient, to obtain a full coordination of all units.

In operation, the fuel control lever 86 (FIG. 3), being slaved with the air throttle 15 (FIG. 1) through lever 87 and linkage 17, operates upon movement of the throttle lever 16 to rotate the shaft 78A (FIG. 3) and the spool 79 secured thereto, opening and closing the orifice 85 simultaneously respectively with opening and closing of the air throttle 15, thereby metering fuel delivery to conduit 34.

Metered fuel under regulated pressure is thus delivered to the manifold valve of FIG. 4, entering passage 95 to chamber 96, through ports 100 to the center, opening the check valve 102, passing into chamber 99 in the valve plunger 98, thence passing into manifold chamber 97 for delivery through ports 108 to conduits 16.

Fuel-air mixture is selectively manually adjusted from the lever 105. Rotation of the shaft 93 variably controls the area of orifice 95 open to the slot 94, so that the mixture may be leaned for economy cruise. The shaft rotates through an angle of about 75°, and final travel of the lever 105 and shaft 93 forces the plunger valve 98 down, closing off ports 100 from the chamber 96 and also closing off all delivery ports 108 from the chamber 97 and from each other, thus producing a positive idle cut-off of the engine. A somewhat similar valve is illustrated in our prior Patent No. 2,913,231, but in the present case the mixture control function is combined with the manifold shut-off for simplicity and reliability of operation and more economical manufacture.

The degree by which the series-connected orifice 80 (FIG. 3) and passage 95 (FIG. 4) are opened determine the amount of fuel delivered to the engine, orifice 80 being controlled by the throttle in changing engine speed, and passage 95 being controlled by a mixture control lever to vary fuel-air ratio as desired.

Figure 5:
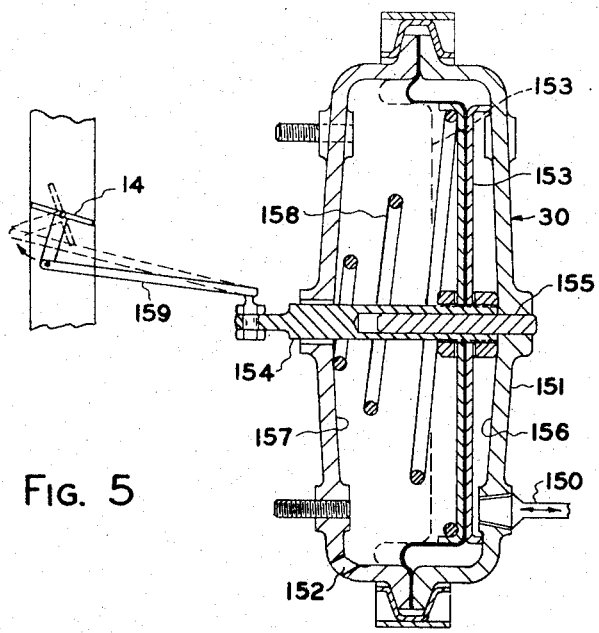
FIG. 5 is a cross sectional view of a preferred pressure controlled waste gate actuator device of the present invention.

*Controller assembly 18, FIG. 3, and waste gate actuator 30, FIG. 5*

Housing portion 76 of the assembly 18 (FIG. 3) is provided with an aneroid chamber 120 as shown, openly connected through a conduit 121 (FIG. 1) and port 122 with the air delivery conduit 12 upstream of the throttle valve 15.

An aneroid 123 in the chamber 120 is carried on a plunger 124 which extends through a bore 125 and is provided with a cam follower 126 riding in a cam slot 127 provided in the throttle-slaved shaft 78. The follower 126 is urged into engagement with the cam slot 127 by a spring 128.

The other end of the aneroid 123 carries a hollow shaft 129 slidable in a bore 132 in the housing portion 75 and having an open end to the right as shown variably adjusted toward and away from the end of a plug 130 adjustably threaded into the housing portion 75. The end of the shaft 129 adjacent the aneroid 123 has ports 131 open at all times to the chamber 120.

A second aneroid 135 is mounted in the chamber 120 on a manually adjustable screw 136 and is connected at the other end to a diaphragm assembly 137 carrying a shaft 138 slidable in a bore 139 provided in the housing portion 75. A passage 147 connects the aneroid chamber 120 with the chamber 146. The poppet valve 145 is, as shown, spring loaded to the closed position. The diaphragm 137 separates the chamber 120 from an atmospheric pressure chamber 141 provided in the housing portion 75 and vented to atmosphere through a port 142. A bore 144 extends transversely across the housing portion 75 and is vented to atmosphere at one end through a restricted orifice 142A.

A conduit 150 connects the bore 144 with one side of the interior of the preferred waste gate actuator housing 151 shown in FIG. 5. The other side of the housing 151 has a vent 152 to atmosphere. The interior of the housing 151 is divided by a diaphragm assembly 153 which, having a central piston 154 as shown, is axially slidably mounted on a pin 155, secured to one side of the housing 151. The diaphragm 153 defines a control chamber 156 and a vent chamber 157, and is urged to decrease control chamber volume by any means such as a spring 158. The piston 154 extends through the housing 151 and is connected by linkage 159 with the waste gate 14.

Operation of the controller 18 to vary the position of the waste gate 14 through the actuator 30 is as follows:

Rotation of the shaft 78 on movement of the air throttle 15 and connecting linkage 17 varies the axial position of or compression on the aneroid 123 by moving of the cam follower 126 on the cam 127. For each position of the air throttle 15 there is a corresponding metering position in the fuel control portion of the controller as described previously and also a corresponding position of or compression on the aneroid 123 and its associated hollow shaft 129 relative to the set position of the plug 130.

Supercharger discharge pressure from the conduit 121 (FIG. 1) enters the inlet 122 and the aneroid chamber 120, and this pressure is sensed by both aneroids 123 and 135 and by the diaphragm 137. With the engine operating and supercharger pressure entering chamber 120, the aneroid 123 will be partially collapsed, moving the open end of the shaft 129 off its seat on the plug 130, so that pressure from the chamber 120 normally escapes through the hollow shaft 129 into the bore 144. This pressure is more than can be vented through the orifice 142A so it is transmitted through conduit 150 to the waste gate actuator 156, moving the diaphragm 153 and piston 154 to position the waste gate 14 to its desired setting. The waste gate 14 position determines the proportion of exhaust pressure directed through the turbine 11, thereby controlling the degree of supercharging of the engine to establish the desired manifold pressure for each air throttle position.

When pressure in the controller chamber 120 tends to go below the setting called for by the cam 127, the aneroid 123 expands, moving the open end of the hollow shaft 129 toward its seat on the inner end of the plug 130, cutting off supercharger pressure to the bore 144, conduit 150, and actuator chamber 156. The actuator spring 158 moves the diaphragm 153 and piston 154 to the right, actuating the waste gate towards its closed position and thus increasing supercharger pressure by increasing tubrocharger speed. Air from the chamber 156 flows backward through conduit 150 into the bore 144 of the housing portion 75 (FIG. 3) and is vented therefrom to atmosphere through the port 142A.

Conversely, when pressure in the chamber 120 tends to go higher than the required setting, the aneroid 123 tends to collapse, unseating the open end of the shaft 129 from the plug. More supercharger discharge air will flow through the shaft 129 into the bore 144, thus raising the pressure in the actuator chamber 156, moving the diaphragm 153 and piston 154 to the left, and actuating the waste gate 14 towards its open position. This decreases supercharger pressure by decreasing turbocharger speed.

Thus, this part of the controller achieves a balance for every air throttle position, in which just the right amount of supercharger discharge pressure is admitted to the actuator chamber 156 to maintain a stability of or constant straight-line discharge pressure and hence maintains air intake manifold absolute pressure at all altitudes.

The upper portion of the controller, that portion including the aneroid 135 and associated parts and chambers, is called the pressure ratio section. Its function is to override the above mentioned controller operation when the aircraft reaches critical altitude, to prevent overspeeding and over-temperature operation of the turbocharger. For each absolute pressure value, a critical altitude limit is established, above which the absolute pressure must decrease to prevent overspeeding. The diaphragm and aneroid of the pressure ratio section as presently arranged are preferably constructed and set so that the poppet valve will operate at about a 2.2:1 ratio.

For example, at 36" absolute pressure, critical altitude will be about 16000', since 16000' equals 16.21" Hg Abs. and 36/16.21 equals 2.2/1 (approx.)

In operation, when atmospheric pressure in chamber 141 to the right of the diaphragm 137 decreases, so that the ratio of pressures between chamber 120 and 141 reaches about 2.2:1, the shaft 138 will be moved to the right, opening the poppet valve 145. Pressure from chamber 120 enters the bore 144 via passage 147 and chamber 146, thus increasing the pressure transmitted to the waste gate actuator 30 to open the waste gate 14 and decrease turbocharger speed. This device operates to produce a sharp break in the pressure curve at critical altitude.

Thus a system is provided in which an optimum relationship is maintained between manifold pressure and throttle position in a turbosupercharged engine at all altitudes up to critical, at which point the pressure ratio section overrides the basic control means to prevent supercharger overspeed.

It will be noted that the waste gate actuator 30 may be operated by a pressure admitted from any source, which pressure admission is controlled by the aneroids 123 and 135. The present system preferably uses supercharger discharge pressure for this function to provide a full pneumatically operating system having very simplified and reliable components.

In summary, the present invention consists of a fuel-air charging system in which fuel metering is based upon three parameters; namely, supercharger discharge pressure upstream of the throttle valve, throttle position, and engine speed, and in which turbocharger speed is discharge-pressure controlled relative to selected settings of the throttle, with an atmospheric pressure controlled override at and above critical altitude.

The system of metering the fuel delivered by the engine driven pump (variable with engine speed) comprises, in series, the following components:

(1) Bypass metering of the charging fuel including (a) a variable orifice varying delivery capacity as a function of supercharger pressure upstream of the throttle; and (b) a downstream pressure control relief valve varying delivery rate as a function of supercharger pressure upstream of the throttle;

(2) A throttle control varying fuel delivery from the bypass metering device relative to throttle position;

(3) A manual mixture control selectively varying fuel delivery from the throttle control for economy cruise and idle cutoff; and (4) A fixed restriction at the injection nozzle with downstream pressure control, which is uniform with and compensates for the operation of the relief valve.

Both the relief valve and the fixed orifice injection nozzle provide pressure control on the fuel relative to controlled supercharger discharge pressure.

Although we have described only one embodiment of the invention, it will be apparent to one skilled in the art to which the invention pertains that various changes and modifications may be made therein without departing from the spirit of the invention or the scope of the appended claims.

We claim:

1. A controller for a turbocharger waste gate in the charging system of an internal combustion engine having engine cylinders, an air intake means directing air to said cylinders and provided with a throttle valve, an exhaust driven turbosupercharger for pressurizing air upstream of said throttle valve variably relative to actuation of said waste gate, and means delivering fuel to said cylinder, said controller comprising, a pressure responsive actuator operably connected with said waste gate for actuation thereof, a housing having a control chamber openly connected with said air intake means upstream of said throttle valve, a pressure responsive means in said chamber, valve means carried by said pressure responsive means and operable in response to pressure changes in said chamber to variably deliver supercharger pressure from said chamber to said actuator for controlling actuation of said waste gate, the improvement comprising means for operably connecting said pressure responsive means with said throttle valve to vary the positioning of the pressure responsive means and the valve carried thereby responsively with movement of said throttle valve.

2. A controller for a turbocharger waste gate in the charging system of an internal combustion engine having engine cylinders, an air intake means directing air to said cylinders provided with a throttle valve, an exhaust driven turbosupercharger for pressurizing air upstream of said throttle valve variably relative to actuation of said waste gate, and means delivering fuel to said cylinder, said controller comprising, a pressure responsive actuator operably connected with said waste gate, a housing having a control chamber openly connected with said air intake means upstream of said throttle valve, a pressure responsive means in said chamber, valve means carried by said pressure responsive means and operable in response to pressure changes in said chamber to variably deliver supercharger pressure from said chamber to said actuator for controlling actuation of said waste gate, the improvement comprising, said housing having a transverse passage adapted for connection with said actuator, a bore in said housing intersecting said passage and opening into said chamber, said valve means comprising a hollow tube opening into the chamber and the passage and slidably extending through said bore and operably connected with said pressure responsive means, a closure for the opening of the tube disposed in said passage and arranged to variably open and close communication of the tube with said passage as the tube is moved by said pressure responsive means whereby to variably admit pressure from the chamber into said passage sensed by the pressure responsive means.

3. The controller as defined in claim 2 and in which said controller further comprises:
 (a) a shaft rotatably carried by said housing and operably connected at one end with the throttle valve for rotation therewith, said shaft carrying a cam;
 (b) an aneroid in said chamber and carried by a shaft operably engaging said cam for axially positioning said aneroid relative to rotation of said second mentioned shaft; and
 (c) said valve means being carried by said aneroid and axially moved therewith in response to throttle movement and the pressure changes in said chamber to variably control pressure delivered to said waste gate actuator.

4. The control as defined in claim 3 and which said valve means comprises:
 (a) a pressure passage in said housing adapted for connection with said waste gate actuator; and
 (b) said tube being carried at one end by said aneroid and extending into said pressure passage.

5. A controller as defined in claim 3 and including:
 (a) a second aneroid in said chamber;
 (b) a second pressure chamber in said housing and open to atmospheric pressure, said second chamber separated from the first chamber by a flexible diaphragm;
 (c) said second aneroid mounted in the first chamber and carrying a second valve means connected to said diaphragm for operation of said second valve means by changes in the pressure differential across the diaphragm and pressure changes in the first chamber sensed by the second aneroid; and
 (d) said second valve means being operable to variably open communication between the first chamber and said pressure passage to thereby modify the pressure delivered to said waste gate actuator by operation of the first valve means.

6. The controller as defined in claim 2 and including
 (a) a second pressure responsive means in said chamber,
 (b) valve means carried by said second pressure responsive means and operable in response to pressure changes in said chamber and to changes in atmospheric pressure to variably vent pressure from said actuator when the ratio of supercharger discharge pressure to atmospheric pressure rises to and above a selected value.

7. The controller as defined in claim 2 and including means operably connecting the pressure responsive means with said throttle valve to vary the positioning of the pressure responsive means and the valve means carried thereby responsively with movement of said throttle valve.

References Cited
UNITED STATES PATENTS

| | | | |
|---|---|---|---|
| 2,024,202 | 12/1935 | Berger | 123—119 |
| 2,500,234 | 3/1950 | Bates | 123—119 |
| 3,035,408 | 5/1962 | Silver | 60—13 |

LAURENCE M. GOODRIDGE, *Primary Examiner.*